United States Patent [19]

Gross et al.

[11] 4,329,407
[45] May 11, 1982

[54] ELECTROCHEMICAL STORAGE BATTERY

[75] Inventors: Franz Gross, Neckargemünd; Hermann Birnbreier, Sandhausen, both of Fed. Rep. of Germany

[73] Assignee: Brown, Boveri & Cie AG, Mannheim-Käfertal, Fed. Rep. of Germany

[21] Appl. No.: 162,745

[22] Filed: Jun. 25, 1980

Related U.S. Application Data

[63] Continuation of Ser. No. 35,499, May 3, 1979, abandoned.

[30] Foreign Application Priority Data

May 5, 1978 [DE] Fed. Rep. of Germany ....... 2819600

[51] Int. Cl.³ .............................................. H01M 4/36
[52] U.S. Cl. .................................... 429/101; 429/120
[58] Field of Search ........................ 429/120, 101–104

[56] References Cited

U.S. PATENT DOCUMENTS

| | | | |
|---|---|---|---|
| 3,525,386 | 8/1970 | Grover | 429/120 X |
| 3,865,630 | 2/1975 | Reimers | 429/120 X |
| 4,042,757 | 8/1977 | Jones | 429/120 X |

*Primary Examiner*—Charles F. Lefevour
*Attorney, Agent, or Firm*—Herbert L. Lerner

[57] ABSTRACT

Electrochemical storage cell, particularly of the alkali metal and sulfur type having at least one storage cell with insulation around the cell to minimize heat loss, and an interspace between the cell and the insulation. A heat exchanger in the form of a closed hollow body is partially filled with a vaporizable medium. The heat exchanger has two heat exchange zones in open communication. A first heat exchange zone is disposed in the interspace for preventing overheating of the cell by vaporization of the cell contained therein. The second heat exchange zone is disposed adjacent means for absorbing heat to condense vapors of medium which flow from the first heat exchange zone to the second heat exchange zone.

9 Claims, 7 Drawing Figures

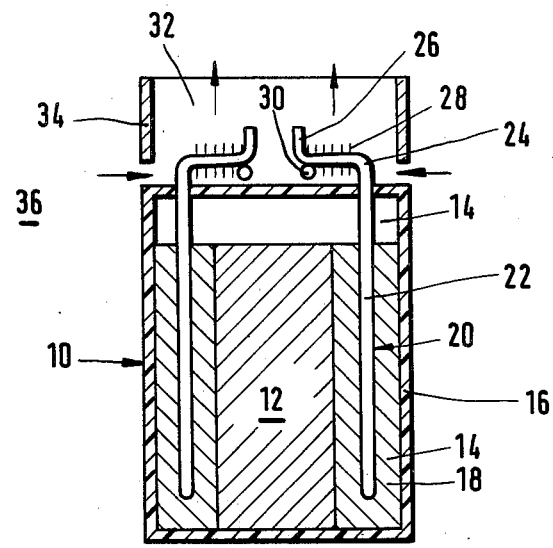
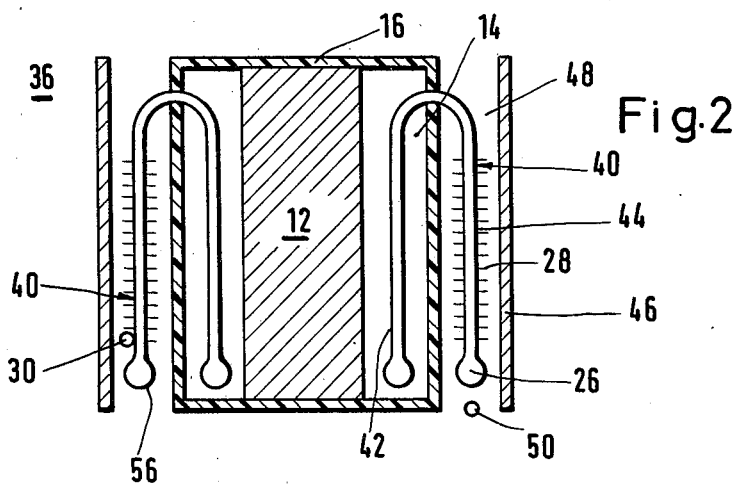
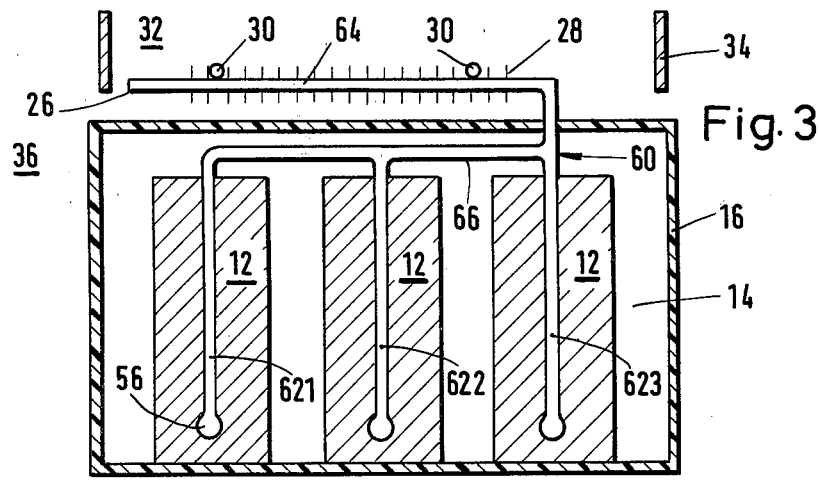

ELECTROCHEMICAL STORAGE BATTERY

This is a continuation of application Ser. No. 035,499, filed May 3, 1979, now abandoned.

BACKGROUND OF THE INVENTION

1. Field of the Invention

The invention relates to an electrochemical storage battery, especially of the alkali metal and sulfur type, with at least one storage cell, insulation around the cell, and an interspace between the storage cell and the insulation.

2. Description of the Prior Art

In one known electrochemical storage battery of this type which is provided with insulation against heat losses, heat exchangers in the form of vertical tubes traverse the interspace, There, the lower, open ends of these tubes lead directly into the outside space, while the upper open ends are provided with a shut-off organ or valve means. If there is danger that the storage battery might overheat, the shut-off organ is opened, to permit ambient air to circulate through the tubes and cool the interior of the storage battery.

It is a disadvantage of this known design that the density of the heat flux, i.e. calories per unit area per unit time, which can be obtained with a heat exchanger of the known kind, is very low, so that heat exchangers even in larger numbers cannot prevent with certainty an undesirable temperature rise in an electrochemical storage battery.

SUMMARY OF THE INVENTION

It is an object of the invention to provide an electrochemical storage battery of the type mentioned at the outset, which is provided with insulation against heat losses, in such a manner that its storage cell can be brought into heat exchange to effectively prevent an undesirable temperature in the storage battery. The battery design for controlling the temperature should be simple and cost-effective and meet the operational requirements.

With the foregoing and other objects in view, there is provided in accordance with the invention, an electrochemical storage battery with at least one storage cell, insulation around the cell, an interspace between the cell and the insulation, a heat exchanger in the form of a closed hollow body partially filled with a vaporizable medium, said heat exchanger having at least two heat exchanger zones in open communication, with a first heat exchange zone disposed in the interspace for preventing overheating of the cell by vaporization of the medium contained therein and a second heat exchange zone disposed adjacent means for absorbing heat to condense vapors of medium which flow from the first heat exchange zone to the second heat exchange zone.

Other features which are considered as characteristic for the invention are set forth in the appended claims.

Although the invention is illustrated and described herein as embodied in an electrochemical storage battery, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 diagrammatically shows an electrochemical storage battery with a heat storage medium in a vertical cross section, FIG. 2 is a vertical cross section of a variant of FIG. 1, FIG. 3 is an electrochemical storage battery with three storage cells showing a design variant with respect to the heat exchangers.

DETAILED DESCRIPTION OF THE INVENTION

Figure 4:
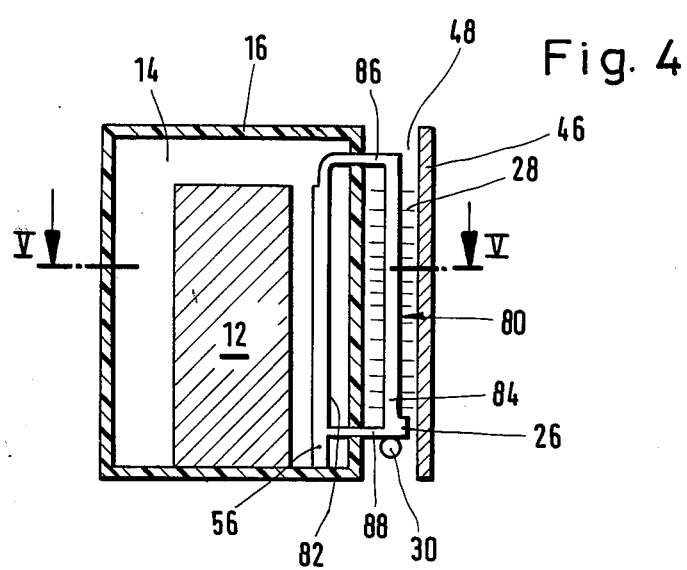
FIG. 4 is an electrochemical storage battery in a vertical cross section showing another design variant of the heat exchanger.

In an electrochemical storage battery of the type mentioned at the outset, the heat exchanger is designed as a closed hollow body containing a partial filling of a medium that can be evaporated. The heat exchanger has at least two heat exchange zones in open communication with each other. A first heat exchange zone adjoins, at least in some areas, the interspace. At least one second heat exchange zone adjoins at least one heat absorbing medium, at least in some areas.

The heat to be exchanged or removed evaporates the medium in the assigned zone. Examples of the medium are mercury, thermo-oil, i.e. heating oil such as naphtha or gas oil, or water. The vapor generated by the heat to be removed flows inside the heat exchanger from a heat exchange zone to the other cooler exchange zone and is condensed there, giving off heat. The condensate produced can be transported back by gravity or, if necessary, by capillary structures which are arranged on the inside of the heat exchanger and connect both zones to each other. By virtue of vaporization of liquid, passage of a stream of vapor, and condensation of vapor, a heat transport with very high heat flux density, i.e. high heat transfer rate is obtained. The heat exchange of the heat exchanger in accordance with the invention is substantially improved so that adequate heat exchange can be obtained with a small number of heat exchangers. It is of advantage if the heat exchange zones are arranged completely in the interspace or the heat-absorbing medium.

To improve the heat transfer of the second heat exchange zone, it is advantageous to enlarge its heat-exchanging surface area, such as by means of ribs, pins or bosses. Such increased surface means can also be used on the heat exchange surface of the first zone, but the advantage is not as great as with the second zone, because the storage cell gives off some of its heat by radiation to the first zone which is narrowly spaced from the first zone. The ambient space, i.e., the air of the ambient space surrounding the second heat exchange zone, can serve as the heat-absorbing medium, and the air can be fed-in by means of a blower.

If the removed heat is not to be lost but is intended to be used during pauses in the operation for keeping the storage battery hot, i.e. in the nature of a heat flywheel, then the second zone of the heat exchanger advantageously adjoins a heat storage medium. Fire clay, oil or, preferentially, a salt or salt mixture can be used which, in the range of the operating temperature of the storage cell, is subject to a phase change such as melting or solidification. Sodium nitrate $NaNO_3$ or sodium hydroxide $NaOH$ are examples of heat storage media.

If ambient air is used as the heat-absorbing medium, the simplest procedure is to arrange the second zone in an approximately vertical well which is open at the ends. Through the chimney effect of this well, increased air circulation and thereby, increased exposure of the second zone is achieved.

If the storage battery has vertical insulation at least in some areas, then it is advantageous if the well is formed by the insulation and a shield wall arranged at a distance therefrom. This results in a very simple compact design.

In a particularly preferred further embodiment of the invention, the second zone is provided with heating means. This permits heat to be supplied to the storage cells if necessary, when, for instance, they have temperatures below the necessary operating temperatures in the initial start-up and must therefore be heated up. In this case, the second zone serves as the heat-absorbing zone and the first zone gives this heat off to the interspace or the storage cell, respectively. The heating system can consist of a heating element which is in direct contact with the second zone and is heated by a heat carrier or electrically heated. This heating element can also be arranged at a distance from the second zone and transmit heat from the heating element to the second zone by convection and radiation.

If several heat exchangers are provided in a storage battery, it is desirable to have the second zone of at least one heat exchanger provided with at least one heating element.

In order to achieve automatic, temperature-dependent heat transfer between the two heat exchange zones, the heat exchanger contains second constituent, namely, gas as well as at least one collecting space connected to the second zone as well as, at least one collecting space connected to the first zone for the gas. The partial amount of the gas and the collecting space are proportioned so that below a given temperature value the second or first zone, respectively, is filled at least largely, by the gas and thus the heat transfer is inhibited completely or at least almost completely, while above the given temperature value the gas is pressed by the evaporated medium at least partially into the collecting space and the second or first zone, respectively, is available for heat exchange, at least in some of the area. Bringing in the preferably inert gas such as helium, argon, nitrogen, or air, makes controlled heat transfer possible. The collecting spaces provided at both zones permit a reversal of the heat transfer direction when required almost indefinitely.

If several storage cells are provided in a storage battery, then the heat exchanger comprises advantageously several first zones, at least one first zone preferably being associated with each storage cell. In this manner, temperature equalization within the heat insulation can be obtained, since part of the medium evaporated in warmer first zones is condensed in colder first zones. This heat exchange, which takes place within the insulation, can then be superimposed on the heat exchange with the outside space or atmosphere.

If the storage battery is to have a mounting area as small as possible, it is advantageous to arrange the second zone essentially above the storage battery. If, on the other hand, the storage battery is to have an overall height as small as possible, then it is advisable to arrange the second zone essentially laterally of the storage battery.

The simplest solution is to design the heat exchanger as a pipe; the cross section may have any shape. The first zone of the heat exchanger may be connected via at least one vapor line and one condensate line each to the second zone so as to form a closed circuit. Corrosion-resistant steel can serve as the material for the heat exchanger.

In order to improve the heat transfer it is advantageous if the first zone surrounds the shell of the storage cell at least in some area with a small spacing therefrom and is, in particular, in the form of a narrow hollow body. Likewise, the second zone can consist of a preferably flat hollow body which is arranged at a distance from the insulation and the profile of which is matched to the shape of the insulation.

Further advantages of the invention are evident from the description of embodiment examples in conjunction with the schematic drawings.

Like parts are provided with the same reference symbols in the individual figures.

Referring to FIG. 1, the storage battery 10 comprises a vertically arranged cylindrical storage cell 12. This storage cell 12 is merely indicated for the sake of simplification, without regard to its specific design. As can further be seen from FIG. 1, the cylinder surface as well as the top surface of the storage cell 12 is surrounded by a space 14, while no space is provided at the base area, since the storage cell stands on the insulation 16. The shape of the insulation 16 is prismatic, but it can optionally also be cylindrical. The interspace 14 is filled in the vicinity of the cylinder surface of the storage cell 12 with a heat storage medium 18, which can consist, for instance, of fire clay material or salt mixtures or liquid.

The heat exchangers 20 are designed in tubular shape as heat pipes, with a crosssectional area of about 70 to 280 $mm^2$. Their first heat exchange zone 22 extends vertically over the entire height of the interspace 14 and is embedded in the heat storage medium 18. The adjacent second heat exchange zone 24 extends approximately at a right angle to the first zone 22 and at a distance from the outside surface of the horizontal upper insulation 16 in the direction toward the vertical symmetry axis of the storage battery. At the end of the second zone 24, an approximately vertical collecting space 26 for a partial gas filling is further provided, the function of which will be explained later. The second heat exchange zone 24 has means 28 for increasing the outside surface, such as ribs, pins or bosses. This zone is also provided with a heater 30 which can be, for instance, a heating element heated electrically or by a heat carrier and is preferably in direct contact with the second heat exchange zone 24. As can be seen from FIG. 1, several heat exchangers 20 of the same kind are provided, with the second heat exchange zones 24 pointing approximately toward the vertical central axis of the storage battery. The number of heat exchangers is determined by the desired heat exchange capacity.

The wall 34, which is approximately aligned with the cylinder surface of the storage battery, defines an approximately vertical well 32, the upper end of which is open to the outside atmosphere 36. The wall 34 ends at a sufficient distance from the upper, approximately horizontal area of the insulation 16, to permit air to freely enter the well 32 and to flow around and cool the second heat exchange zones 24 which are arranged in the interior of the well 32. The higher the well, the better is the circulation of the ambient air through the well 32.

Electrochemical storage batteries of the type shown here operate at elevated temperatures. The operating temperature of a battery of the sodium and sulfur type is, for instance, about 300° C. During charging and discharging, undesired temperature increases occur frequently, which are caused by the internal electric resistance of such batteries.

In order to avoid such undesired temperature increases, the first zone 22 of the heat exchangers is partially filled with a medium which evaporates somewhat above the operating temperature of the storage battery, for instance, 10° to 80° C. above. The vapor resulting from the evaporation flows into the second zone 24 of the heat exchanger, is condensed there, and gives off heat which is removed by the ambient air circulating through the well 32. The chimney effect of the well 32 increases the air supply to the second zones 24, so that effective heat removal from these zones takes place. This is greatly aided by the means 28 which increase the outside surface area of these zones.

In order to obtain automatic control of the heat transfer, i.e., to avoid heat removal at the operating temperature and below the operating temperature, the heat exchangers have in addition a partial filling of a gas, preferably an inert gas. Examples of gases which may be employed are nitrogen, helium, argon or air. This partial filling of the heat exchange with gas is proportioned, i.e. the quantity of gas introduced is adjusted so that at the operating temperature or below, the second heat exchange zone 24 is to a large extent or completely filled by the inert gas and thereby, circulation of the evaporated medium in this second zone 24 is prevented and consequently little or no heat is transferred from the first zone to the second zone. However, if the temperature of the heat exchanger rises, then the gas is gradually displaced into the collecting space 26 by the expansion of the evaporated medium connected therewith, and subsequently sufficient vapor enters the second heat exchange zone 24 wherein the vapor is condensed and in the process giving off heat.

The gas, when pushed to the limit is urged completely into the collecting space 26. If the temperature of the storage battery drops, the process takes place in the reverse, i.e., the gas again fills the second heat exchange zone 24, so that no heat can be given off to the outside atmosphere.

The condensate produced in the second zone 24 returns automatically to the lower first heat exchange zone 22; to this end, a small inclination toward the first heat exchange zone 22 is provided. It is more advantageous, however, to place a capillary structure inside of the heat exchanger. The collected condensate is returned to the heated zone through capillary action without inclination of the second heat exchanger toward the first heat exchanger.

The situation can also occur, of course, that the storage battery is at a temperature which is too low for its operation. In that case, the heaters 30 are put into operation and the second zone 24 is heated sufficiently to effect heat transport from the second zone 24 to the first zone 22. The medium in the second zone 24 in the heat exchanger is evaporated and the generated vapors flow into the first zone 22 wherein they give off heat. In that case, the capillary structure arranged in the interior of the heat exchanger effects the return of the condensed medium from the first zone 22 (condensation zone) to the second zone 24, which then serves as the evaporation zone.

If heat is supplied by the heater 30, as described above, the gas which was introduced into the heat exchanger is urged by the vapor into the first heat exchange zone 22 and collects at the end of this zone, so that this zone 22 does not participate fully in the heat transfer. Since the heat required to be transferred in the present state of operation of heat input to zone 22, is usually smaller than with heat removal to the outside atmosphere, this is usually not a disadvantage. However, if the maximally possible heat transfer performance is desired, a collecting space 56 is also provided at the end of the first heat exchange zone 22, as is indicated, for instance, in FIGS. 2 and 3.

It is evident that thus an automatic removal of excess heat from cell 12 is provided in a simple manner as well as a simple procedure of supplying heat to heat up the cell if its temperature is too low.

In FIG. 2, a variant of an electrochemical storage battery is shown. The differences from FIG. 1 are that, the height of the storage cell 12 is equal to the inside height of the interspace 14; no heat storage medium is disposed in the space 14; and the heat exchangers 40 have a hairpin shape or inverted U-shape with heat exchange zones 42 and 44 pointing approximately vertically downward. The collecting space 26 for the inert gas is located in the extension of the second zone 44, and the collecting space 56 is arranged in the extension of the first zone 42. The shield wall 46 is placed at a distance from the vertical area of the insulation 16 and forms the well 48 which is open at top and bottom and in which the second zone 44 extends vertically. The shield wall 46 follows the profile of the outside wall of the insulation 16 with approximately constant spacing.

The electric heater 30 provided at the heat exchanger 40 shown at the left is directly fastened to the latter as in FIG. 1. The heater 50 associated with the heat exchanger shown on the right, on the other hand, is disposed as a design variant, a vertical distance from the lower end of the heat exchanger, so that the heat given off by the heater 50 is transmitted by convection and radiation.

The operation of the heat exchangers 40 is similar to the operation of the heat exchangers 20 of FIG. 1. It should further be noted that the heat exchanger 40 is provided on the inside with a capillary structure to effect the return of the collected condensate.

The variant according to FIG. 3 is shown in a side view, with the portion of the insulation 16 facing toward the viewer having been left off to open up a view into the interior. Similarly, the front portion of the wall 34 is left off, so that also a view into the interior of the well 32 is provided.

As shown in FIG. 3, three storage cells 12 are arranged with spacing side by side and are surrounded by the common insulation 16. The heat exchanger 60 is provided to connect the interspace 14 to the outside atmosphere 36. Heat exchanger 60 has three first heat exchange zones 621, 622, 623 which extend approximately vertically. Each zone is associated with a storage cell 12. All three zones are connected to a manifold 66 which lies in the upper portion of the interspace 14. This manifold 66 passes through the insulation 16 vertically and becomes the second heat exchange zone 64 which, spaced from the insulation 16, extends approximately horizontally. The collecting spaces 26 and 56 for the inert gas are provided in the manner as previously described. Two heaters 30 are disposed adjacent second zone 64.

The heat exchanger 60 with three first zones 621, 622 and 623 has the advantage that temperature differences in the space 14 are equalized by these zones. If, for instance, the first zone 621 is hotter than the first zone 622, heat transport from the first zone 621 to the colder first zone 622 sets in. This heat transport continues until the temperature differences are equalized. This internal heat transport can be superimposed on an outward heat transport to the second zone 64 or vice versa.

Capillary structures are provided on the inside of the heat exchanger 60 for returning the accumulated condensate.

Figure 5:
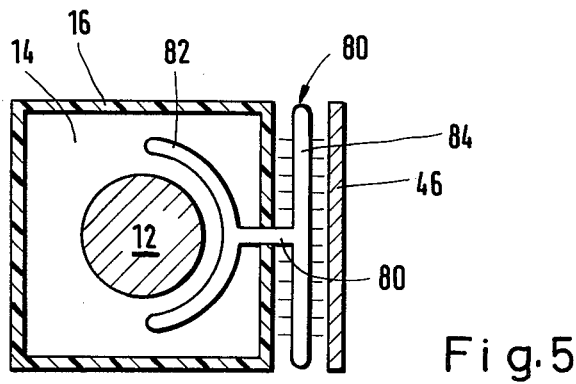
FIG. 5 is a horizontal cross section taken along line V—V of FIG. 4.

In FIG. 4, which shows a vertical cross section and in FIG. 5, which shows a horizontal cross section, the heat exchanger 80 has heat exchange zones 82 and 84, which have the form of flat or narrow hollow bodies. The first heat exchange zone 82 is about the height of the storage cell 12 and surrounds the circular profile of the latter on about one half the circumference with little spacing from the cell, e.g., 2 to 10 mm (see FIG. 5). The second heat exchange zone 84 is arranged in a vertical well 48 which is formed between the shield wall 46 and the vertical outside of the insulation 16.

The upper region of the first zone 82 is connected to the upper region of the second zone 84 via a vapor line 86 which goes through the insulation. The lower region of the second zone 84 has a condensate line 88 which likewise goes through the insulation 16 and leads into the lower portion of the first zone 82, so that the heat transport can take place in a closed loop by means of circulation of medium in the form of vapor and condensate.

Collecting spaces 26 and 56 for the inert gas as well as a heater 30 are provided in the embodiment of FIGS. 4 and 5 in a manner known from the previous embodiment examples. Due to its large heat exchange surfaces, the variant according to FIGS. 4 and 5 exhibits particularly good heat transfer.

Figure 6:
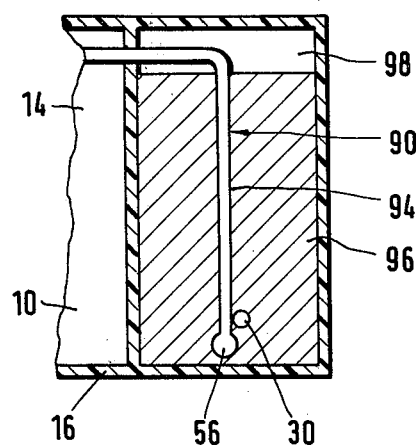
FIG. 6 is a vertical cross section through a storage battery with the heat storage device arranged next to it, the storage battery being shown only partially.
Figure 7:
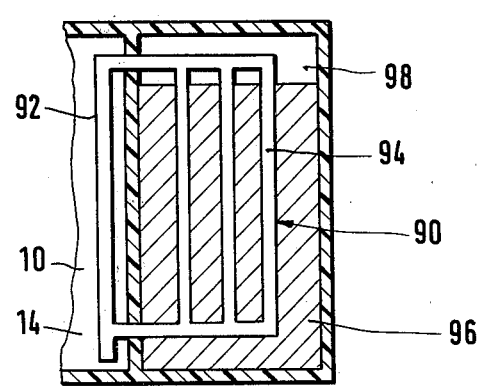
FIG. 7 is a design variant of the embodiment of FIG. 6.

In FIGS. 6 and 7, the second heat exchange zone 94 of the heat exchanger 90 is arranged in a heat storage medium 96, while the first heat exchange zone 92 is arranged, as described above, in the storage battery 10 which is shown only partially. The heat storage medium, preferably a salt mixture, is provided in a heat-insulated container 98 which is arranged next to the storage battery 10 and adjoins the latter directly.

During pauses in the operation, the heat storage medium 96 returns heat to the storage battery 10 and thereby prevents excessive cooling. Here, the storage medium 96 can be used in addition to a heat storage medium 18, as was used in the embodiment example of FIG. 1.

In FIG. 7, an embodiment variant of the heat exchanger 90 of FIG. 6 is shown. The difference is that the second heat exchange zone 94 is designed as a tube array and is connected by vapor and condensate lines to the first heat exchanger zone 92 to form a closed circuit. The collecting spaces 26 and 56 for the inert gas are not shown in FIG. 7.

There are claimed:

1. Electrochemical storage battery of alkali metal and sulfur with at least one storage cell, insulation around the cell, to minimize loss of heat from the cell, an interspace between the cell and the insulation, a heat exchanger in the form of a closed hollow body partially filled with a vaporizable medium, said heat exchanger having at least two heat exchange zones in open communication, with a first heat exchange zone disposed in the interspace and embedded in a heat storage medium filled in the interspace for preventing overheating of the cell by vaporization of the medium contained therein, and a second heat exchange zone arranged in a heat storage medium, provided in a heat insulated container positioned beside the storage battery to condense vapors of medium which flow from the first heat exchange zone to the second heat exchange zone and also to return heat to the storage battery and prevent cooling during pauses in operation of the battery, and a heater for heating the second heat exchange zone if the temperature of the storage battery is too low, in which case the second zone is heated to effect heat transport from the second zone to the first zone.

2. Electrochemical storage battery according to claim 1, wherein the first heat exchange zone of the heat exchanger is connected to the second heat exchange zone by a vapor line and by a condensate line, forming a closed loop.

3. Electrochemical storage battery according to claim 1, wherein the heat storage medium is a salt mixture.

4. Electrochemical storage battery according to claim 3, wherein the second heat exchange zone is in the form of a tube array and is connected by vapor and condensate lines to the first exchanger zones to form a closed circuit.

5. Electrochemical storage battery according to claim 1, wherein the heat storage medium is a phase-change material selected from the group consisting of sodium nitrate and sodium hydroxide.

6. Electrochemical storage battery according to claim 1, wherein the storage cell is cylindrical with its cylinder surface and top surface surrounded by an interspace and wherein the interspace contains a heat storage medium selected from the group consisting of fire clay material, salt mixture and liquid.

7. Electrochemical storage battery of alkali metal and sulfur with several storage cells, insulation around the cells, to minimize loss of heat from the cells, a heat exchanger in the form of a closed hollow body partially filled with a vaporizable medium, said heat exchanger having a plurality of first heat exchange zones, with at least one first heat exchange zone adjacent to each storage cell for preventing overheating of the cell by vaporization of the medium contained therein, and a second heat exchange zone which is disposed in a vertical well formed by two walls and open at the top and bottom to obtain a chimney effect of air flow therethrough to condense vapors of medium which flow from the first heat exchange zones to the second heat exchange zone, and a heater for heating the second heat exchange zone, if the temperature of the storage battery is too low, in which case the second zone is heated to effect heat transport from the second zone to the first zone.

8. Electrochemical storage battery according to claim 7, wherein the well is formed by an approximately vertical region of the insulation and a shield wall extending at a distance therefrom.

9. Electrochemical storage battery according to claim 7, wherein the second heat exchange zone is arranged in a heat storage medium.

* * * * *